Sept. 18, 1951   F. C. LINDVALL ET AL   2,568,455
ROCKET LAUNCHER

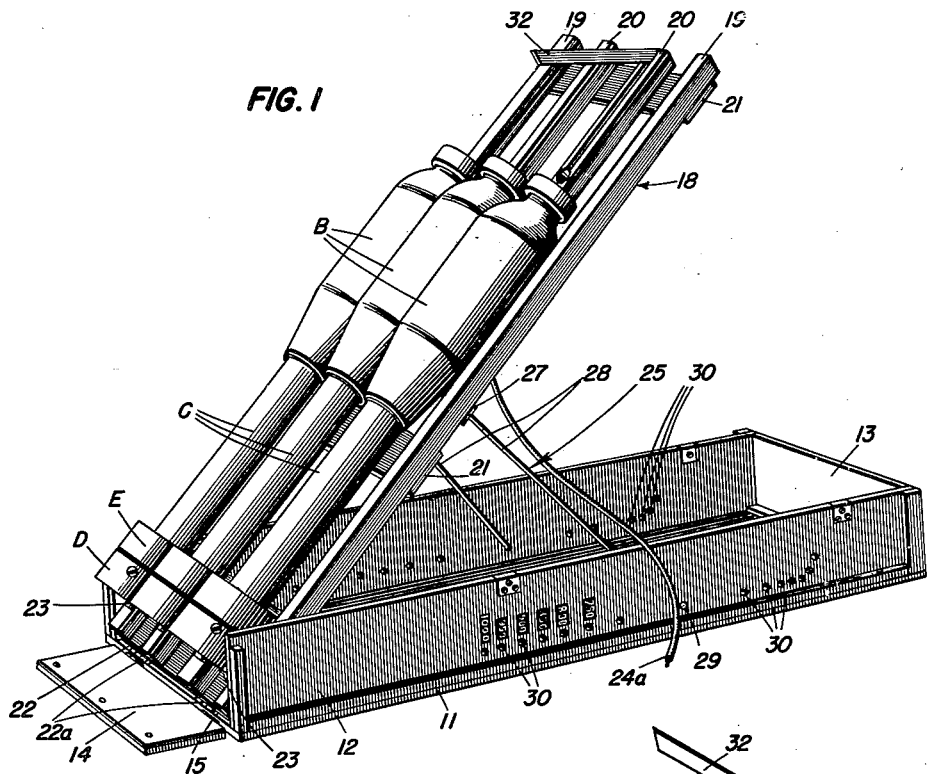
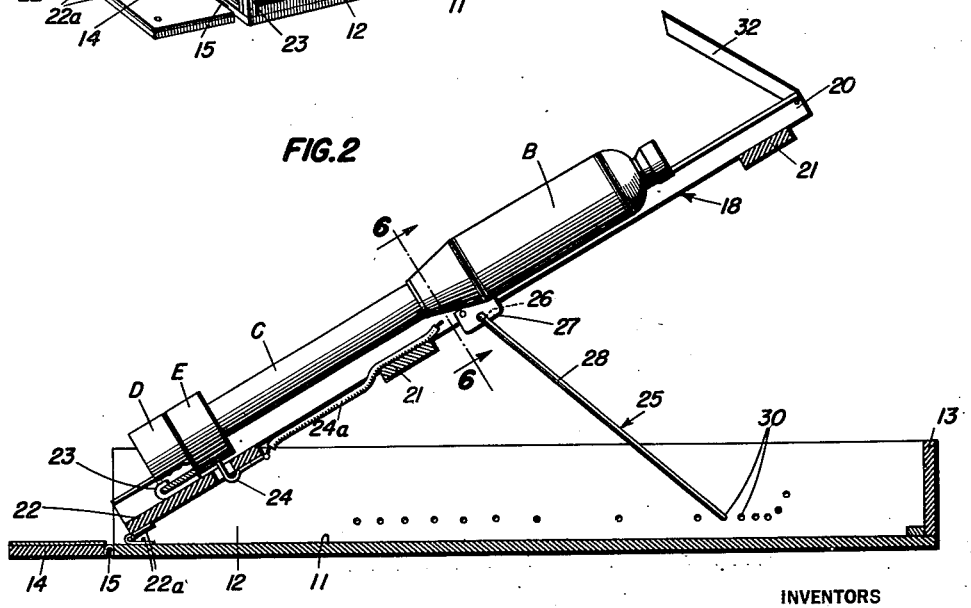

Filed March 28, 1945   2 Sheets-Sheet 2

INVENTORS
FREDERICK C. LINDVALL
PAUL E. LLOYD
BY Ralph L. Chappell
ATTORNEY

Patented Sept. 18, 1951

2,568,455

UNITED STATES PATENT OFFICE 2,568,455

ROCKET LAUNCHER

Frederick C. Lindvall, Altadena, and Paul E. Lloyd, Pasadena, Calif., assignors to the United States of America as represented by the Secretary of the Navy Application March 28, 1945, Serial No. 585,279½

1 Claim. (Cl. 89—1.7)

1

This invention relates to a rocket launcher, and more particularly to a combination rocket projectile packing case and launcher of novel construction.

One of the principal reasons for the widespread use of rockets in warfare is the fact that they provide a relatively great fire power without the use of a heavy gun. This permits their use in situations where the weight, size, and difficulty of transport of a large gun would make its use impractical; for instance, in mountain and jungle fighting or other warfare where the equipment is carried by the troops themselves. Previous to this invention, when rockets were used by such troops it was necesary to carry the rocket projectiles in their protective cases and also to carry separate rocket launchers. In order to make rocket weapons better adapted to the above mentioned types of warfare, it is desirable to combine the case and the launcher.

A combined carrying case and launcher for rockets is described in U. S. Patent 455,279 issued to P. Cunningham in 1891. However, a launcher of the type shown in that patent must be supported by some object and hence is not completely self contained and is not readily adapted for use under all circumstances. Furthermore, the patented device has no means for correctly positioning the launcher in elevation for any given range.

It is an object of this invention to provide a combined rocket launcher and carrying case which is entirely self contained.

Another object of the invention is to provide an improved rocket launcher which is made of wood or other light-weight, readily available material, and which although capable of limited repeated use, is sufficiently inexpensive that it may be discarded after its first use.

Another object of the invention is to provide an improved rocket launcher which may be quickly set up for operation and adjusted for different ranges.

A further object of the invention is to provide a rocket launcher which is particularly adapted to launch rocket propelled devices having electrically initiated rocket motors of the type disclosed in an application of C. C. Lauritsen, Serial Number 481,645, filed April 2, 1943, now Patent 2,469,350 of May 10, 1949.

These and other objects of the invention will be apparent from the following specification and the accompanying drawings, in which Fig. 1 is a perspective view of the improved packing case rocket launcher shown with rocket projectiles and set up for operation;

2

Fig. 2 is a longitudinal sectional view of the improved launcher shown in Fig. 1, but with the launcher at a different angle of elevation;

Figure 3:
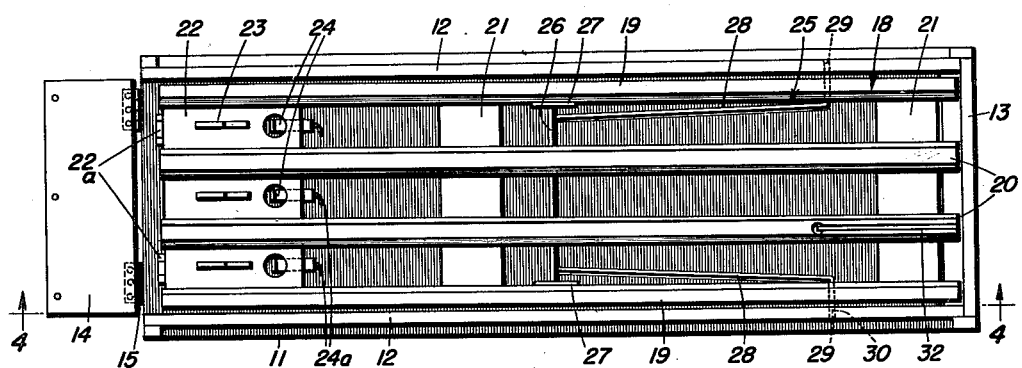
Fig. 3 is a plan view of the launcher folded with the cover removed and one end open.
Figure 4:
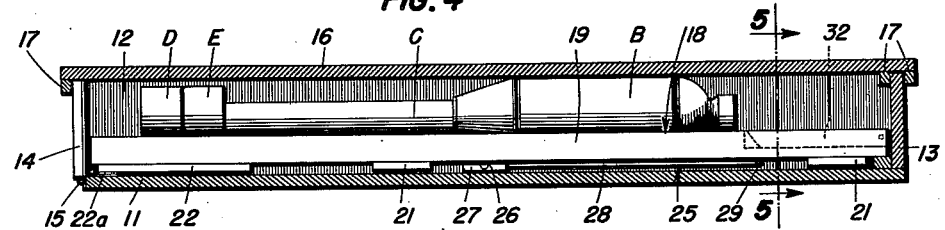
Fig. 4 is a longitudinal sectional view taken on line 4—4 of Fig. 3 but with the cover and end sections in their closed positions.
Figure 5:
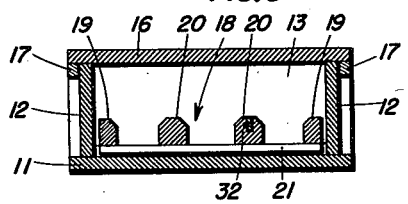
Fig. 5 is a cross-sectional view taken on line 5—5 of Fig. 4.
Figure 6:
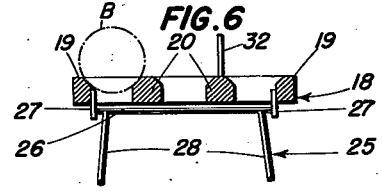
Fig. 6 is a fragmentary cross-sectional view of the launching frame taken on line 6—6 of Fig. 2 showing the supporting bracket in its unfolded position.
Figure 7:
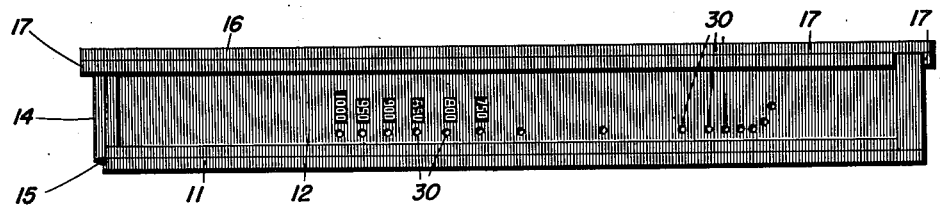
Fig. 7 is a side elevational view of the closed packing case.

In the drawings, the launcher includes a packing box or case formed of a rectangular flat base member 11 having attached thereto upstanding side members 12 and forward end member 13. The rear end member 14 is attached to the base 11 by a hinge 15 so that it may be opened out as shown in Figs. 1, 2, and 3. Said rear end member serves as a blast shield, deflecting the blast from the launcher to avoid damage adjacent rockets when one of them is fired and, when the launcher is based on the ground, prevent loosening the surface dirt and filling the atmosphere with dust. A cover 16 is provided which fits over the sides 12 and ends 13 and 14, and is provided with marginal reinforcing cleats 17. Suitable securing means (not shown) retain the cover in place.

Hinged to the base 11 near its rear end is a launching frame indicated generally by the numeral 18. The launching frame comprises two edge rails 19 and parallel intermediate rails 20 connected by central and forward cross members 21, and by a rear cross member 22 connected to base 11 by a hinge 22a. The four rails 19, 20 are adapted to support three rockets each of which rests between a pair of adjacent rails, the supporting edges of the rails being preferably beveled to provide larger contacting surfaces.

The launcher illustrated in Fig. 1 is adapted to receive three rocket-propelled projectiles, but may be constructed to receive any other convenient number. Each projectile includes a casing or head B containing an explosive or a chemical, and a rocket motor C connected to the rear end of the head. The rear end of the rocket motor is provided with radial fins which carry a pair of axially displaced rings D and E connected by suitable wiring (not shown) to opposite sides, respectively, of the rocket motor igniter (not shown), the details of the rocket motor being disclosed in said Lauritsen application.

The cross member 22 at the rear end of the launching frame carries a pair of electrical contacts for each projectile. The rear contact of each pair comprises a J-shaped metal clip 23 fastened by its long arm to the upper face of the cross member 22, its short arm extending forwardly. The rear ring D of the rocket motor fits within the clip, as shown in Fig. 2, and makes electrical contact with the clip. Contact 23 also serves as a stop to position the rocket device on the launcher. Forward of each contact 23 is a resilient contact 24 which is L-shaped and is attached to the under side of cross member 22 with one leg extending upwardly through a hole in the cross member. Contact 24 engages the forward ring E of the rocket motor when the projectile is in position. The contacts 24 are suitably connected to an electrical conductor 24a leading through a firing switch (not shown) to one side of a current source, which may be attached to the outside of the case. The other side of the current source and the contacts 23 may be grounded to complete the firing circuit.

The launcher frame 18 in its stowed position lies flat on the base member 11 and is adapted to be elevated and supported in an inclined operating position by a bracket 25. The bracket comprises a cross member 26 journaled in bearing plates 27 secured to the edge rails 19, and a pair of legs 28 attached to the cross member 26 and which stow in forwardly extending positions between adjacent rails 19 and 20 with the free ends of the legs sprung inwardly. At their extremities, the legs are provided with outturned foot portions 29 which fit into holes 30 provided in the sides 12 of the packing box. The holes 30 are spaced longitudinally along the sides so as to permit the launcher frame to be supported at various angles of elevation. The legs 28 are sufficiently flexible so that they may be sprung inwardly and moved from one set of holes to another to vary the elevation of the frame. As shown in Fig. 1, the range for each pair of holes may be marked by the holes, usually in increments of 50 yards.

One of the rails is provided at its forward end with a longitudinally-extending slot in which a sighting stick 32 is pivoted by its forward end. The sighting stick is provided with a sighting groove along its upper edge to assist in positioning the launcher in train.

If desired, spirit levels (not shown) may be provided on the packing case to facilitate positioning of the case in a horizontal plane.

In operation, the packing case is set as level as possible, the cover 16 is removed, and the rear end 14 is opened outwardly. The launcher frame is then raised to the desired elevation and the sighting stick is used to aim the launcher rails in the desired direction. The packing box may be weighted down with a few rocks or shovelfuls of earth. The electrical conductors 24a from the contacts 24 are suitably connected to a current source, as mentioned above. In practice, several of the launchers may be used in conjunction with each other, and the electrical control for each of the launchers becomes part of an electrical network permitting firing of the rocket projectiles in various predetermined patterns.

Virtually the entire packing case and launcher may be made of wood with only a few metal pieces for reinforcement and electrical contact. Thus the launcher is low in cost, being hardly more expensive than the conventional packing case alone. Because of its low cost, the launcher need be used only once, but actually may be used several times if the need arises. Furthermore, the packing box type launcher is light in weight and exceedingly portable so that it may be used in places and under conditions which would prohibit the use of any other known device of equal fire power and which would make it less practical to carry separate launchers and rocket-packing cases.

We claim:

A unitary launcher and packing case for rockets consisting of a rectangular box having a base and upstanding walls one of which is hinged for flat opening to provide a blast deflector, a plural-railed launching frame on which rockets are racked for packaging and firing, said frame fitting within the box for transportation and having a hinge connection with the base adjacent to the hinged wall and being swingable on said hinge connection to assume predeterminedly pitched firing positions relative to the base, bearing plates depending from said frame, a cross member journaled in said plates, and legs extending away from the cross member and having out-turned foot portions, said legs being flexed outwardly to exercise pressure against opposite walls of the box when sprung inwardly for stowage, said walls having a distributed series of matching holes, in selected pairs of which the foot portions are held by the tension of the legs after flexure inwardly for insertion of said portions in said selected holes to sustain the frame at the chosen pitch.

FREDERICK C. LINDVALL.
PAUL E. LLOYD.

REFERENCES CITED

The following references are of record in the file of this patent:

UNITED STATES PATENTS

| Number | Name | Date |
|---|---|---|
| 455,279 | Cunningham | June 30, 1891 |
| 499,790 | Meadowcroft | June 20, 1893 |
| 1,380,358 | Cooke | June 7, 1921 |
| 1,449,449 | Sayres | Mar. 27, 1923 |
| 1,580,344 | Stillians | Apr. 13, 1926 |
| 1,601,997 | Coss et al. | Oct. 5, 1926 |

FOREIGN PATENTS

| Number | Country | Date |
|---|---|---|
| 9,976 | Great Britain | 1914 |
| 822,596 | France | Sept. 27, 1937 |